Feb. 27, 1968  R. L. SWANKE  3,371,236
MOTOR MOUNT
Filed June 28, 1965  2 Sheets-Sheet 1
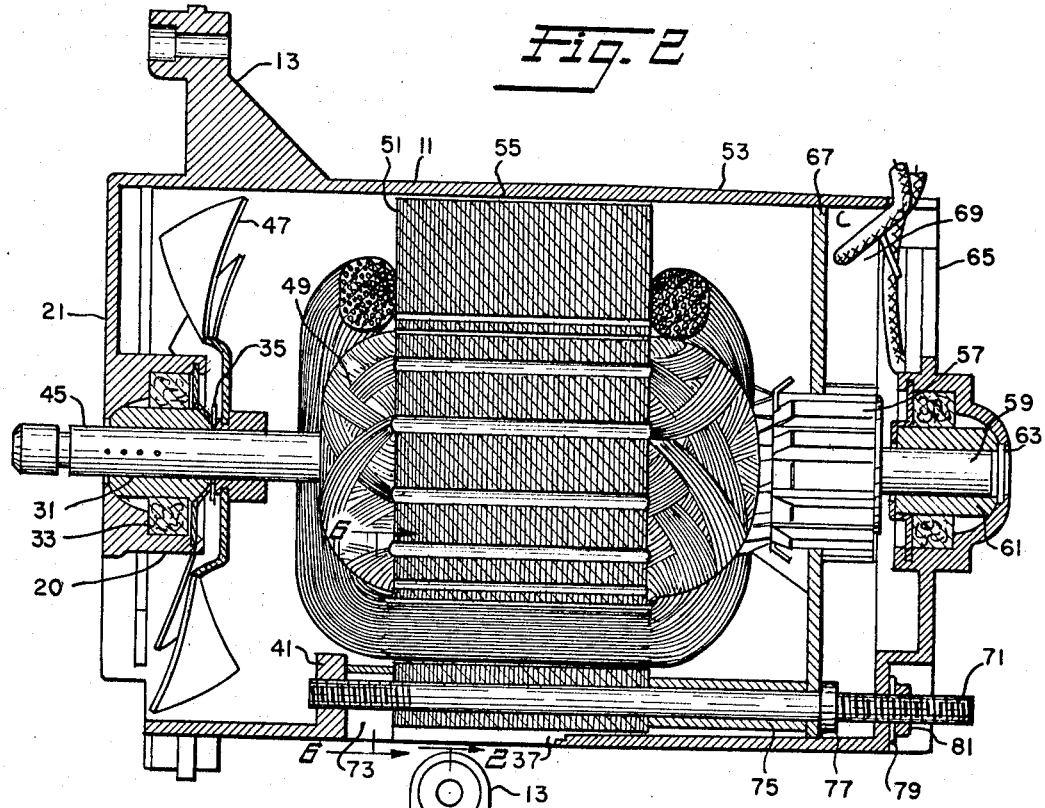
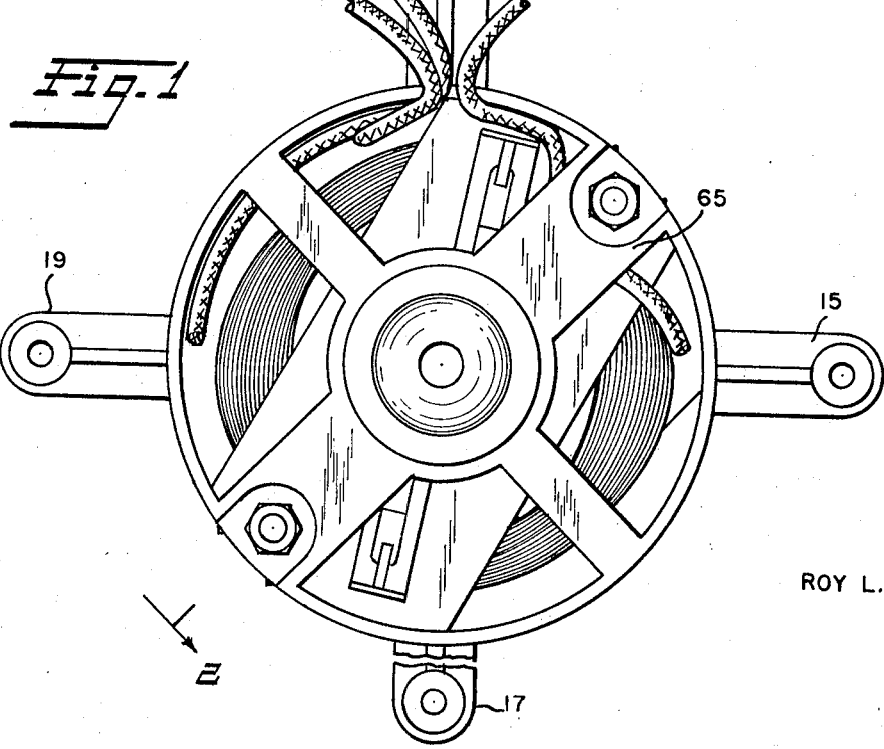
INVENTOR
ROY L. SWANKE Feb. 27, 1968   R. L. SWANKE   3,371,236
MOTOR MOUNT Filed June 28, 1965   2 Sheets-Sheet 2

INVENTOR
ROY L. SWANKE

United States Patent Office 3,371,236
Patented Feb. 27, 1968

3,371,236
MOTOR MOUNT
Roy L. Swanke, Newington, Conn., assignor to Dynamics Corporation of America, New York, N.Y., a corporation of New York
Filed June 28, 1965, Ser. No. 467,282
8 Claims. (Cl. 310—89)

This invention relates generally to a motor mount and more specifically to a motor mount including a casing which is adaptable to a number of different sizes of motors.

Modern day technique for assembling fractional horsepower electric motors involves an assembly line process whereby each element is added to the mounting as the motor is moved from station to station.

One problem which arises during such assembly technique is the necessity for changing a large number of parts including the housing when a slightly different size motor is to be assembled. This not only slows down the production output but also requires a large number of parts to be maintained in inventory and at hand where they may be available in the event of a change in the line.

Accordingly, it is an object of this invention to provide a motor mount which may be used to house fractional horsepower motors of varying sizes.

Another object of this invention is to provide a motor mount which accommodates alternate spacing means of differing dimensions so as to allow the same structural housing to contain and support motors of varying sizes.

A further object of this invention is to provide a motor mount having spacing means which prevents any side air leakage from the housing so as to maximize the efficiency of the motor cooling wind tunnel.

These and other objects of this invention will become apparent from the following description taken together with the drawings wherein:

FIG. 1 shows an end view of a casing housing adapted to the present invention;

FIG. 2 is a sectional view taken along the line 2—2 of FIG. 1;

Figure 4:
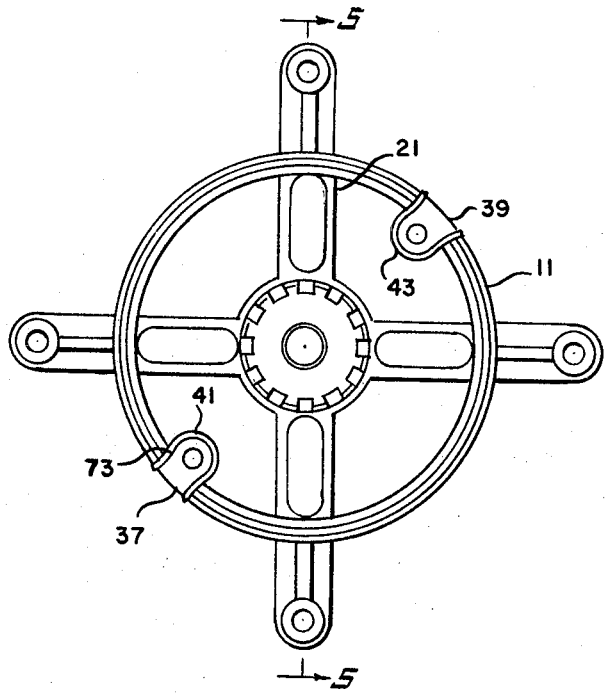
FIG. 4 is an end view of a part of the housing.

Turning now more specifically to the drawings, FIGS. 1 and 2 show the details of a series type motor mounted within a housing which is comprised of a first or upper housing 11 and a second or lower housing 53. Upper housing 11 has lugs 13, 15, 17 and 19 extending outwardly therefrom for purposes of mounting on the equipment with which the motor is to be used. In the particular motor mounting illustrated, the assembly is designed to be used in a highspeed blending device but is, of course, also capable of many other uses.

Upper housing 11 terminates at one end in a spider 21 which is designed so as to house a bearing 31 together with a standard felt washer 33 and a retaining washer 35.

Figure 5:
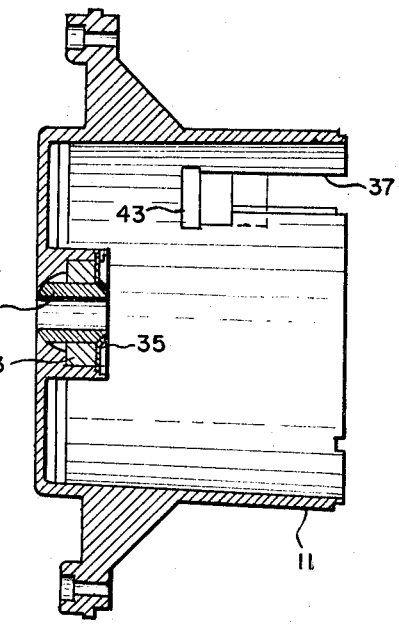
FIG. 5 is a sectional view taken through the lines 5—5 of FIG. 4.

Upper housing 11 also is cast with two slots 37 and 39 as will appear more clearly in FIGS. 4 and 5. The slots terminate at one end adjacent inwardly projecting lugs 41 and 43 and extend outwardly therefrom to the end of the open section of upper housing 11.

The output shaft 45 of the motor extends through the bearing and outwardly of the upper housing 11. A fan 47 is secured to and rotates with the output shaft so as to provide the necessary circulation of cooling air past the armature 49 and field coil assembly 51 of the motor.

The second or lower housing 53 is mated with the upper housing 11 at the joint 55.

Commutator 57 and shaft 59 are supported by a bearing 61 which rests in the hub 63 of the spider 65 at the other end of the motor. The brushes 69 are supported about commutator 57 by means of a plate 67 which is secured to the lower housing 53.

Stud member 71, which is threaded at both ends, extends through the spider 65, the plate 67, the field coil assembly 51 and is threadably secured within the lug 41. A spacer 75 of fixed length surrounds lugs 71 between the plate member 67 and the field coil assembly 51.

A spacer 73 of the desired dimensions separates the lug 41 and the field coil assembly 51.

Figure 3:
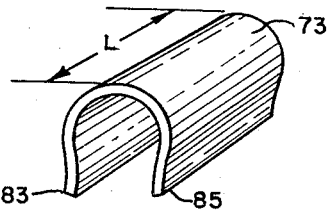
FIG. 3 is a perspective view of a spacer used in the motor mount of FIGS. 1 and 2.
Figure 6:
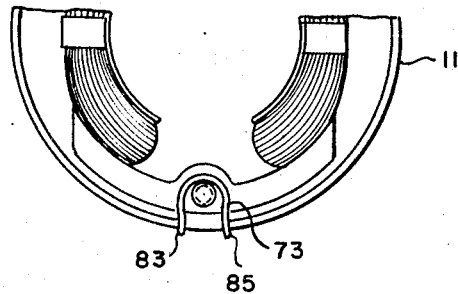
FIG. 6 is a partial sectional view taken along the lines 6—6 of FIG. 2.

As shown in FIG. 3, the spacer 73 is tunnel shaped with the terminating edges 83 and 85 having a reverse curvature so as to provide outwardly extending lips. Spacer 73 may be made of spring steel with a nickel plating or any other type of material which will provide the necessary resiliency so that it can be placed within the slots 37, 39 and released so as to maintain its position therein as shown in FIG. 6. In this manner, the spacer 73 may be placed in the slot adjacent the lug 41 prior to the assembly of the motor itself within the upper housing 11.

FIG. 5 illustrates the versatility and convenience provided by the use of this spacer in the motor mounting techniques. The solid line illustrates a spacer for use with a motor such as one having a one inch lamination stack in the field coil assembly. If a motor with a shorter lamination stack is to be used, then the assembly merely requires that a spacer of a dimension to accommodate the difference in the length of the stack be inserted in the slot as indicated by the dotted line. Therefore, in this assembly technique, the spacer 75 can always be of a standard length and the lug 71 may be of the same size with an integral flange 77 and still be adaptable for all of the various size fractional horsepower motors assembled.

It is well known that adequate cooling is essential for thes high speed motors, and this cooling depends upon the control of the air moving past the motor. Therefore, the housing for these motors is designed so as to have a wind tunnel cooling effect between the two ends of the motor. Any openings in the motor housing between the two ends will allow air to pass outwardly therefrom and reduce the cooling efficiency of the wind tunnel. With the design of the spacer 73, the housing is adaptable to various size motors and at the same time any side air leakage from the motor cooling wind tunnel is prevented by the blocking effect of the spacer.

The present invention not only provides a housing which can accommodate a number of basic fractional horsepower motors but also provides an assembly technique using standard parts in all of these motor mountings. Additionally, the invention provides a mounting wherein very little time and expense are required to change over the motor assembly line to build any of the basic motor designs. Because of the standard nature of the basic motors there is a significant reduction in the initial tooling loss required for the motor assembly line.

It is to be understood that the above description and drawings are illustrative only and that the scope of this invention is to be limited only by the following claims.

I claim:
1. An electric motor mount comprising,
a first housing section,
a plurality of lugs extending inwardly of said first housing section,
a second housing section adapted to mate with said first housing section, said first and second housing sections encompassing a motor including a stator mounted therein, a slot in said first housing section extending from each of said lugs to said second housing section, removable spacer means in said slot abutting said lugs at one end thereof, and means passing through said second housing section and said motor stator and secured to said lug for retaining said motor against the other end of said spacer.

2. The motor mount of claim 1 wherein said spacer is U-shaped with the closed end thereof extending within said housing so as to effectively close said slot.

3. The motor mount of claim 1 wherein said spacer is flexible so as to be retained within said slot by spring tension.

4. The motor mount of claim 1 wherein said spacer is adapted to be interchangeable wtih spacers of various longitudinal dimensions.

5. An electric motor unit comprising, a housing having first and second mating sections, means for supporting an electric motor including a stator within said housing, lug means extending inwardly of said first section, slots means in said first section of said housing extending from said lug means to said second section, removable spacer means fitted within said solt means adjacent said lug means, and means extending through said second section of said housing and secured to said lug means for retaining said motor stator against said spacer.

6. The motor unit of claim 5 wherein said spacer means is U-shaped with the closed portion thereof extending from said slot means within said first section of said housing.

7. The motor unit of claim 5 wherein said spacer means is flexible so as to be self-retained within said slot.

8. The motor unit of claim 5 wherein said spacer is adapted to be interchangeable with other spacers of various longitudinal dimensions so that said unit may accommodate motor stators of differing axial lengths.

No references cited.

MILTON O. HIRSHFIELD, *Primary Examiner.*

L. L. SMITH, *Assistant Examiner.*